Sept. 7, 1965 F. B. MAYNARD 3,205,294

ELECTRONIC MUSICAL INSTRUMENT

Original Filed Feb. 8, 1961 5 Sheets-Sheet 1

(TONE OSCILLATOR)

INVENTOR.
Fred B. Maynard
BY
Mueller & Aichele
ATTY'S.

ELECTRONIC MUSICAL INSTRUMENT

Original Filed Feb. 8, 1961 5 Sheets-Sheet 2

| — | C1 | C2 | C3 | C4 | R1 | R2 | R3A | R3B | R3C |
|---|---|---|---|---|---|---|---|---|---|
| O1 | .5 | .22 | .22 | .22 | 11K | 11K | 840 | 170 | 190 |
| O2 | .5 | .22 | .22 | .22 | 9.1K | 9.1K | 620 | 100 | 190 |
| O3 | .5 | .22 | .22 | .22 | 7.5K | 7.5K | 540 | 60 | 100 |
| O4 | .5 | .22 | .22 | .22 | 6.2K | 6.2K | 270 | 80 | 80 |
| O5 | .5 | .22 | .22 | .22 | 5.1K | 5.1K | 240 | 60 | 80 |
| O6 | .22 | .1 | .1 | .1 | 11K | 11K | 780 | 140 | 180 |
| O7 | .22 | .1 | .1 | .1 | 9.1K | 9.1K | 620 | 120 | 160 |
| O8 | .22 | .1 | .1 | .1 | 7.5K | 7.5K | 480 | 100 | 100 |
| O9 | .22 | .1 | .1 | .1 | 6.2K | 6.2K | 350 | 80 | 80 |
| O10 | .22 | .1 | .1 | .1 | 5.1 | 5.1 | 260 | 60 | 80 |
| O11 | .1 | .05 | .05 | .05 | 11K | 11K | * | * | * |
| O12 | .1 | .05 | .05 | .05 | 9.1K | 9.1K | * | * | * |

* THESE VALUES HAVE NOT BEEN DETERMINED EXPERIMENTLY.

INVENTOR.
Fred B. Maynard
BY
ATTY'S.

ELECTRONIC MUSICAL INSTRUMENT

Original Filed Feb. 8, 1961

| FREQUENCY RANGE c.p.s. | R1 | R2 | $C_1$ | $C_2$ | $C_3$ |
|---|---|---|---|---|---|
| 40-90 | 100 K | 100 K | .1 | .1 | .2 |
| 100-225 | 100 K | 100 K | .03 | .03 | .06 |
| 300-650 | 100 K | 100 K | .01 | .01 | .02 |
| 3000-4000 | 100 K | 100 K | .001 | .001 | .002 |

INVENTOR.
Fred B. Maynard
BY Mueller & Aichele
ATTY'S.

Sept. 7, 1965 F. B. MAYNARD 3,205,294

ELECTRONIC MUSICAL INSTRUMENT

Original Filed Feb. 8, 1961 5 Sheets-Sheet 4

INVENTOR.
Fred B. Maynard
BY Mueller & Aichele
ATTY'S.

(VOICING UNIT -38-)

INVENTOR.
Fred B. Maynard
BY
Mueller & Aichele
ATTY'S.

3,205,294
ELECTRONIC MUSICAL INSTRUMENT

Fred B. Maynard, Phoenix, Ariz., assignor to Motorola, Inc., Chicago, Ill., a corporation of Illinois Continuation of application Ser. No. 87,880, Feb. 8, 1961. This application Jan. 7, 1963, Ser. No. 249,741
5 Claims. (Cl. 84—1.11)

The present invention relates generally to electronic musical instruments; and it relates more particularly to an improved transistorized type of electronic musical instrument, such as an electronic organ.

This application is a continuation of a copending application Serial No. 87,880, filed February 8, 1961.

An important factor in any electronic organ, and in fact in any equipment for producing musical tones by electronic means, is the inclusion of one or more oscillation generators. The oscillation generators in present day electronic instruments may take the form of any one of many known types. For example, inductance-capacitance oscillators using vacuum tubes or transistors, a variety of different types of resistance-capacitance oscillators, or different types of electro-mechanical frequency generators, are presently in widespread commercial use for this purpose.

The type of oscillator chosen to be incorporated into an electronic organ, or other electronic musical instrument, should possess certain inherent characteristics. For example, the oscillator should exhibit good tonal stability, that is, an ability to maintain its preset frequency in the presence of changes in temperature or humidity, or in the presence of changes in the characteristics of the circuit components. In addition, the oscillator should include relatively uncomplicated switching and tuning controls so that the keyboard need not be unduly complex. It is also important, of course, that the oscillator be relatively simple and economical in its construction.

Accordingly, it is a general object of the present invention to provide an improved electronic musical instrument which incorporates oscillator circuits exhibiting good tone stability even under changing environmental conditions, and which may be tuned in a relatively simple manner and by relatively uncomplicated controls and circuitry.

Another object of the invention is to provide an improved electronic organ with an oscillator circuit which is capable of providing a wide range of tonal variations for organ voicing purposes.

A further object of the invention is to provide such an improved electronic organ, in which the keyboard switching requirements are extremely simple so as to render the keyboard construction uncomplicated and straightforward.

Another object of the invention is to provide such an improved electronic organ, or the like, which is straightforward and economical in its construction and which is relatively simple to service and maintain.

A feature of the improved electronic instrument of the invention, in the embodiment to be described, is the provision in the circuitry thereof of a plurality of transistorized oscillator circuits of the twin-T or parallel-T type, which oscillators have satisfactory stability and are independent of variations in transistor parameters or of variations in exciting voltages.

Another feature of the invention is the provision of a simple unambiguous keyboard switching system, by which the pressing of two or more keys does not detune the oscillators in the organ, but causes only the circuit associated with the key representing the higher frequency actually to be activated.

Additional requirements in an electronic musical instrument, such as an organ, are some means for providing organ "voicing," and for providing tone vibrato or tremolo. Organ voicing is the provision of some means for enabling the organ to render a plurality of different musical timbre effects. The voicing means enables any one tone, whose fundamental frequency is established, to have different harmonic content so that it can have different tonal contents and sound in different ways.

A further feature of the invention is the utilization of different points in the twin-T oscillator circuit in the electronic organ to produce different tonal effects for voicing purposes.

A most important characteristic of organ music is the periodic rapid tone fluctuation imparted by tremolo or vibrato. These terms are often used interchangeably, but in fact mean different things. Tremolo refers to a periodic fluctuation in intensity, whereas vibrato refers to a periodic small variation in the actual frequency of the note around a mean frequency which establishes the pitch of the note.

Another feature of the present invention is the provision of an electronic musical instrument, such as an organ, which incorporates improved oscillator circuits which may be readily modulated for tremolo and vibrato purposes.

In general, the improved electronic musical instrument of the invention, in addition to the features discussed above, is advantageous in that it may operate at a relatively low voltage, it has no shielding requirements, it possesses simple and compact circuitry, it is capable of battery operation, it may be light in weight to be readily portable, it has negligible heat dissipation, and it may be manufactured and sold at a relatively low cost.

Further objects and advantages of the invention will become evident from the following detailed description, when the description is considered in conjunction with the accompanying drawings, in which:

FIGURE 1 is a schematic representation of a twin-T oscillator which is used in the embodiment of the invention to be described;

FIGURES 2*a*, 2*b* and 2*c* are curves representing three different tones which may be derived from the oscillator of FIGURE 1, all three tones having the same fundamental frequency but having different harmonic content;

Figure 4:
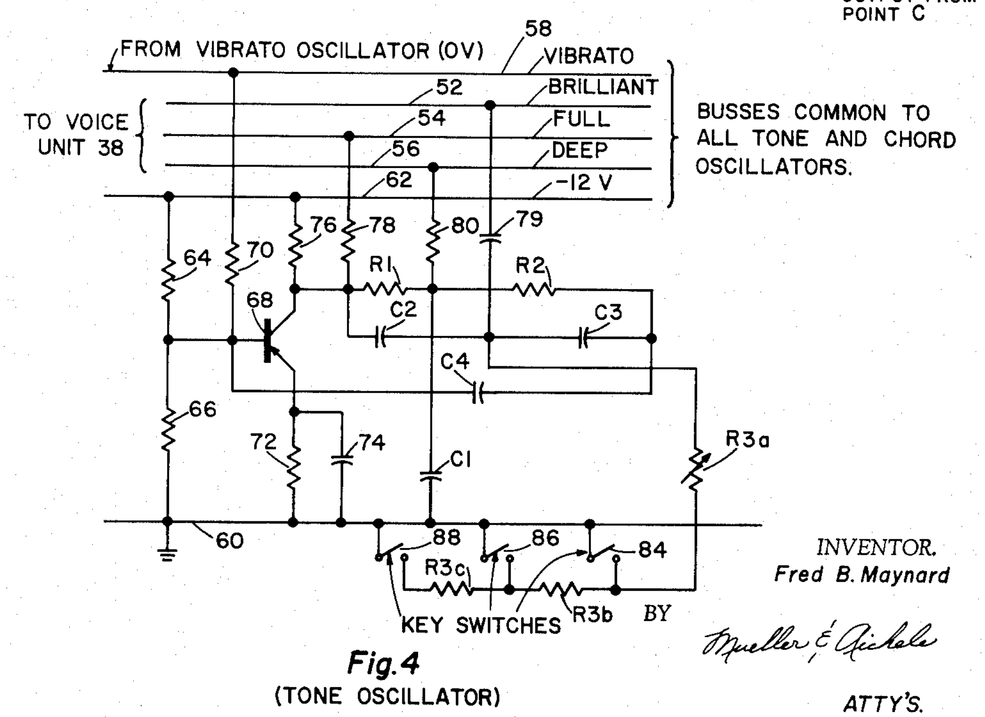
FIGURE 4 is a circuit diagram of a twin-T oscillator suitable for use as any one of a plurality of tone oscillators included in the organ of FIGURE 3.
Figures 3, 5:
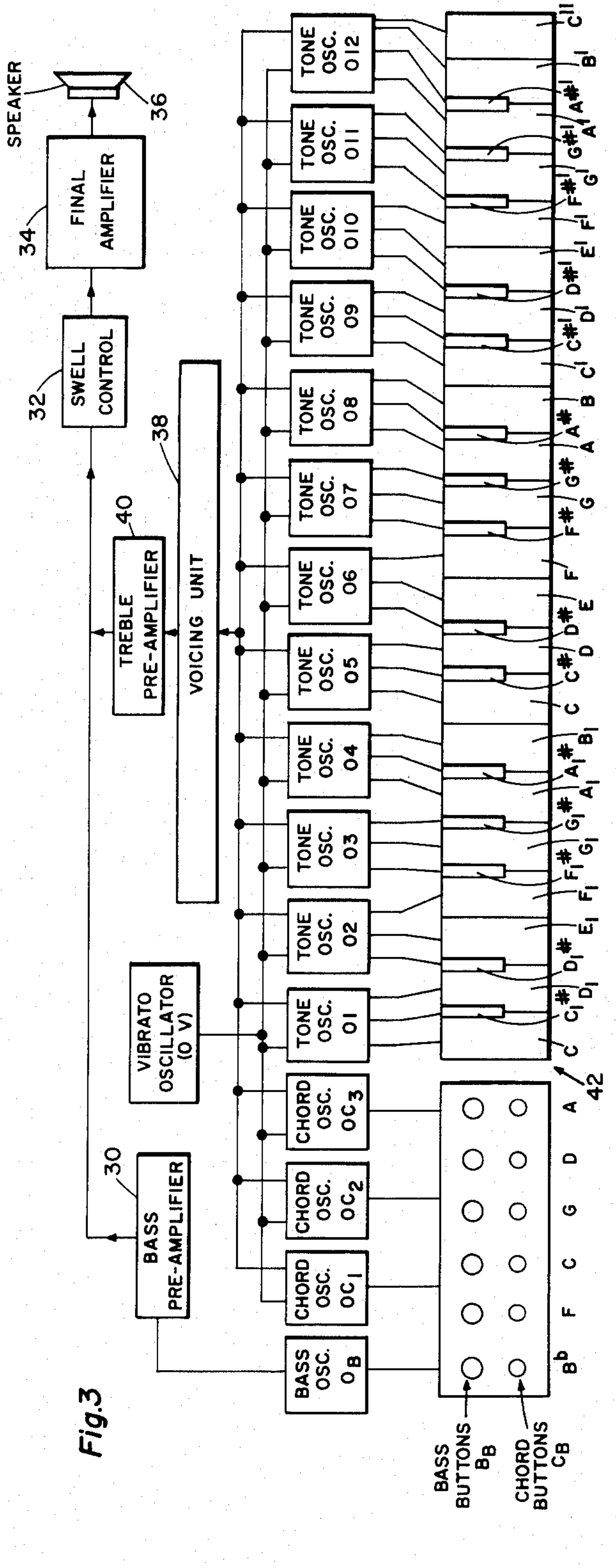
FIGURE 3 is a block diagram of a musical instrument in the form of an electronic organ constructed in accordance with one embodiment of the invention.
Figures 4A, 5A:
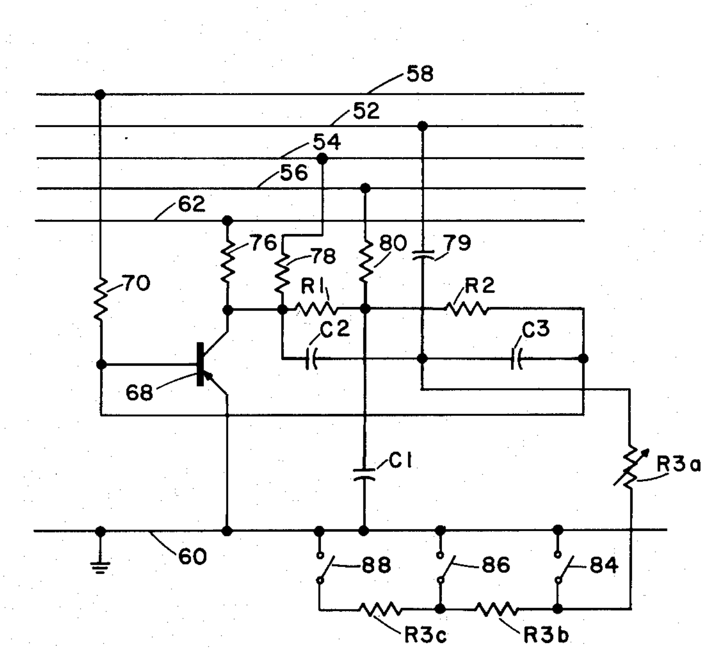
Figure 6:
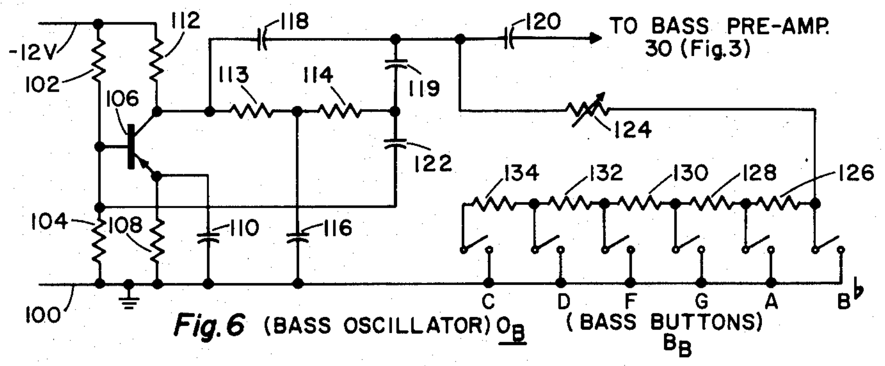
Figure 7:
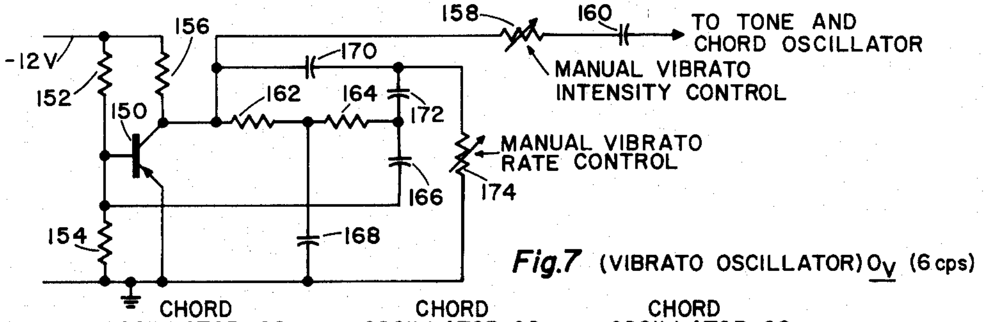
Figure 8:
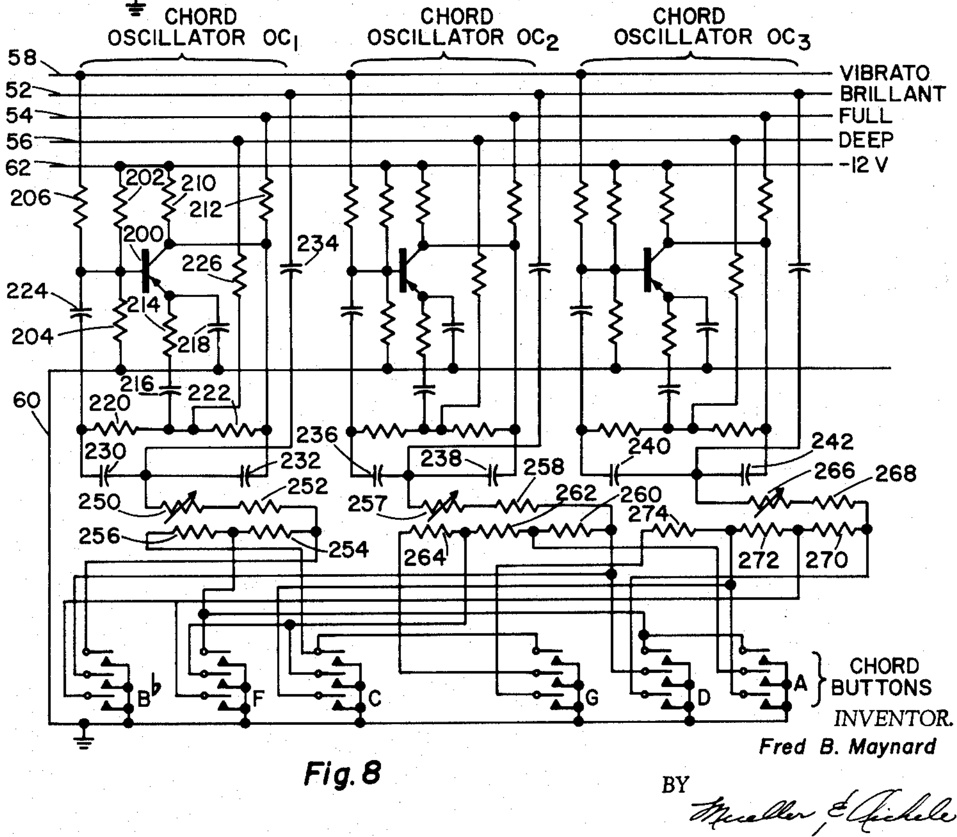
Figure 9:
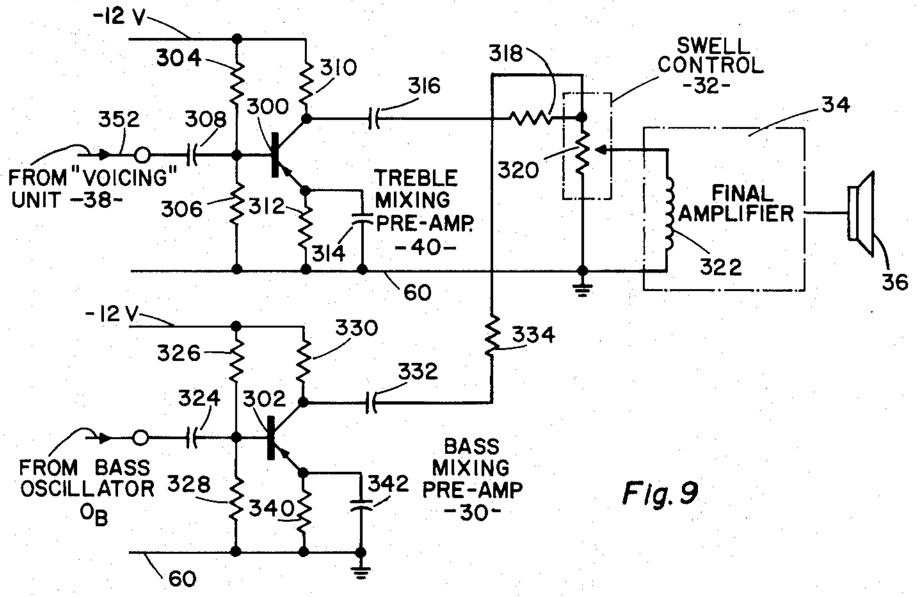
Figure 10:
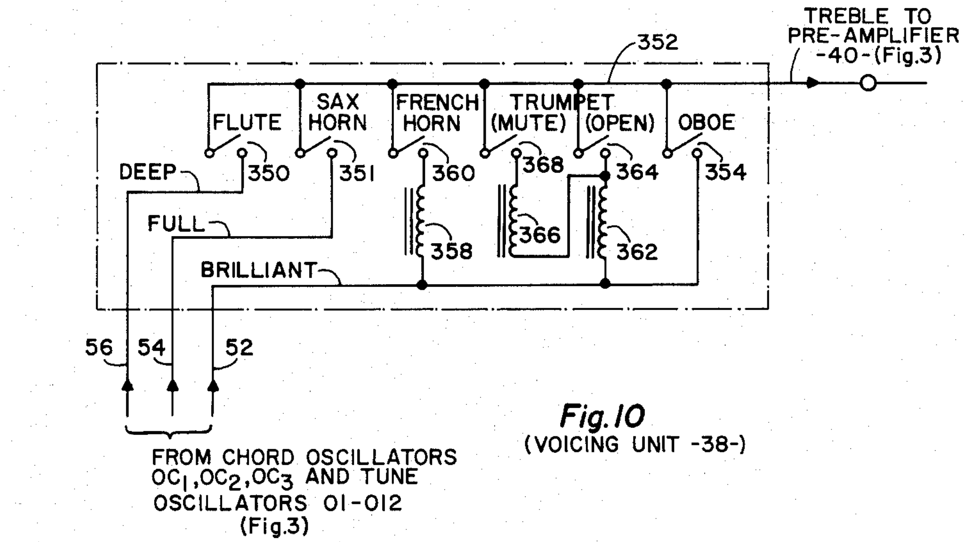

FIGURE 4*a* is a circuit diagram of a second embodiment of a twin-T oscillator suitable for use as the tone oscillators in FIGURE 3;

FIGURES 5 and 5*a* are tables listing different values for certain components of the oscillators of FIGURES 4 and 4*a* to adapt the oscillators for use as different ones of the plurality of tone oscillators in the embodiment of the invention shown in FIGURE 3;

FIGURE 6 is a circuit diagram of a twin-T oscillator suitable for use as a base oscillator in the electronic organ of FIGURE 3;

FIGURE 7 is a circuit diagram of twin-T oscillator suitable for use as a vibrato oscillator in the electronic organ of FIGURE 3;

FIGURE 8 is a circuit diagram of a plurality of twin-T oscillators connected as chord generators in the embodiment of the invention illustrated in FIGURE 3;

FIGURE 9 is a circuit diagram of treble and bass mixing pre-amplifiers included in the embodiment of the invention shown in FIGURE 3; and FIGURE 10 is a circuit diagram of a voicing control unit for use in the embodiment of the invention of FIGURE 3.

Figure 1:
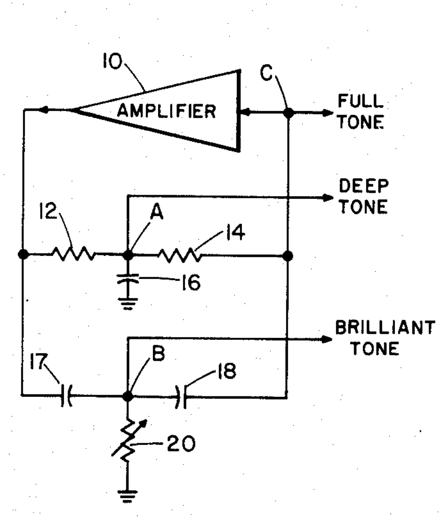

The twin-T oscillator circuit of FIGURE 1 includes a stabilized high gain amplifier 10. A low-pass filter comprising a pair of series resistors 12 and 14, and a grounded capacitor 16 connected to the common junction of the resistors, is coupled between the output and input terminals of the amplifier 10. A high-pass filter including a pair of series capacitors 17 and 18, and a grounded variable resistor 20 connected to the common junction of the capacitors, is also coupled between the output and input terminals of the amplifier 10.

The low-pass filter and the high-pass filter referred to in the preceding paragraph, together form a twin-T network which provides a 180° phase shift in the voltage feedback at the frequency of oscillation. The frequency of oscillation of the oscillator circuit is determined by the values of the resistors and capacitors in the twin-T network.

The twin-T oscillator is most advantageous for present purposes in that it is capable of providing a plurality of signals, each having a common fundamental but having different harmonic content. These signals are produced at different output points in the oscillator circuit, and they create a plurality of different organ tones which may be used for organ voicing purposes.

Figure 2A:
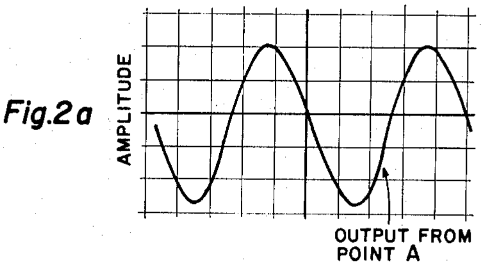

For example, at the point A at the mid-section of the low-pass filter 12, 14 and 16, an output signal may be derived which has a strong fundamental frequency but which has no appreciable higher harmonic frequencies. This signal is almost a pure sine wave, as shown by the curve of FIGURE 2*a*. Musically, this tone is very deep in effect, and it is like the tone of an organ flute.

Figure 2B:
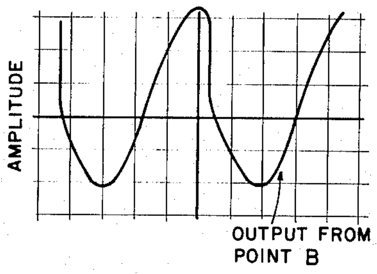

A second output signal may be obtained at the point B in the mid-section of the high-pass filter 17, 18 and 20. This second output signal has a weak fundamental frequency, but it is rich in harmonic frequencies. The signal has a wave form of the type shown in FIGURE 2*b*. The high harmonic content of this latter signal provides a very reedy musical tone, similar to that of an oboe or bassoon. The latter output signal produces a tone which may be referred to as "brilliant."

Figure 2C:
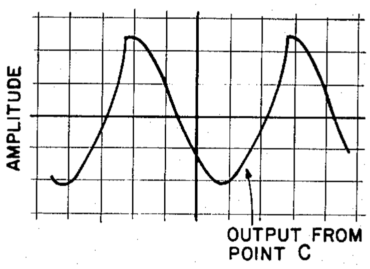

A third signal, which may be considered a full tone, is derived at the point C in FIGURE 1. This third signal is, in effect, a summation of the two extreme wave forms of FIGURES 2*a* and 2*b*, and is shown in FIGURE 2*c*. The third tone is similar to that of a cello or a viola.

A feature of the oscillator circuit of FIGURE 1 is that its multiple wave form output signals can be used independently, or mixed in any proportion, without any interference in the oscillator itself.

The bridge conditions for oscillation in the circuit of FIGURE 1 require that the value of the resistor 12 be approximately equal to the value of the resistor 14; the value of the resistor 20 be approximately $\frac{1}{10}$–$\frac{1}{20}$ of the value of either of the resistors 12 or 14; the value of the capacitor 17 be approximately equal to the value of the capacitor 18; and the value of the capacitor 16 be about twice the value of the capacitors 17 or 18.

However, the bridge conditions for oscillation are not critical. For example, oscillation can be obtained when the capacitor 16 has a value of the order of 1.5 times the value of the capacitor 17. Oscillation can also be obtained when the resistors 12 and 14 are somewhat unbalanced. These factors permit the use of low cost components in the oscillator circuit. For example, capacitors and resistors with ±10% tolerances can be used without affecting the oscillating capabilities of the circuit.

The precise frequency of the oscillator, however, is established by the actual values of the bridge components. It is therefore necessary to tune the oscillator to the desired frequency. Ordinarily, this can be accomplished by adjusting the variable resistor 20. In addition, the frequency range of the oscillator can be varied by changing the values of the bridge resistors or capacitors, or both. Lower frequencies require larger resistance values and larger capacitance values. The bridge resistance values, however, cannot be altered over large ranges due to impedance matching considerations. For that reason, different frequency ranges are usually obtained by using different capacitor values. For example, a vibrato oscillator included in the embodiment of the invention to be described, and which oscillates at 6 c.p.s., uses 10 microfarad and 5 microfarad capacitors. A bass oscillator, also included in the embodiment of the invention to be described, and which oscillates at 64 c.p.s., on the other hand, uses 1 microfarad and .5 microfarad capacitors. Treble oscillators, also included in the embodiment of the invention to be described, use capacitor values of the order of .2 microfarad and .1 microfarad.

The electronic organ shown in the block diagram of FIGURE 3 includes a bass oscillator $O_B$; three chord oscillators $O_{C1}$, $O_{C2}$ and $O_{C3}$; and twelve tone oscillators O1–O12. The oscillators may all be of the twin-T type discussed above.

The bass oscillator is coupled to a bass mixing preamplifier 30 which, in turn, is coupled through a swell control 32 to a final amplifier 34. The final amplifier 34 is coupled to a usual speaker 36. The chord oscillators $O_{C1}$, $O_{C2}$ and $O_{C3}$ and the tone oscillators O1–O12, are all coupled to a voicing control unit 38. The voicing control unit, in turn, is coupled through a treble mixing preamplifier 40 to the swell control 32.

A vibrator oscillator $O_V$ is coupled to the chord oscillators $O_{C1}$, $O_{C2}$ and $O_{C3}$, and to the tone oscillators O1–O12. The bass oscillator $O_B$ is controlled by six bass buttons $B_B$, and the chord oscillators $O_{C1}$—$O_{C3}$ are controlled by six chord buttons $C_B$. The tone oscillators O1–O12 are controlled by a keyboard 42. The vibrato oscillator $O_V$ provides a low-frequency, modulating signal to the tone and chord oscillators. This signal is controlled both in frequency (c.p.s.) and in intensity by variable controls or by preset stops. The three chord oscillators provide an independent source of chord frequencies. If desired, the chord frequencies can be tapped from the tone oscillators O1–O12, but some loss in musical flexibility then results. The bass oscillator $O_B$ in the particular system illustrated in FIGURE 3 is not vibrato modulated, but it may be if so desired.

The illustrated keyboard 42 in FIGURE 3 is a three octave chromatic keyboard of 37 notes. The keyboard is connected to the tone oscillators O1–O12 in a manner such that each of the tone oscillators O1–O11 provides frequencies for three half-tones, and such that the tone oscillator O12 provides four half-tones. Melody and harmony can be played on the keyboard 42 with both hands and without any appreciable loss in musical flexibility.

The basic twin-T oscillator circuit for the tone oscillator O1–O12 is shown in FIGURE 4. The different output points of the oscillator circuit are connected to different ones of a plurality of buses 52, 54 and 56.

These buses are common to all the tone oscillators, and they are connected to the voicing control unit 38.

The brilliant tone is developed on the bus 52, the full tone is developed on the bus 54, and the deep tone is developed on the bus 56. A fourth bus 58 is common to all the tone oscillators, and this fourth bus receives the vibrator signal from the vibrator oscillator $O_V$.

The tone oscillator of FIGURE 4 is activated by a 12 volt direct voltage source, the positive terminal of which is grounded. The grounded bus from this source is designated 60 in FIGURE 4, and the negative bus from the source is designated as 62. A pair of resistors 64 and 66 is connected in series between the buses 62 and 60. The resistor 64 may have a resistance of 200 kilo-ohms, for example, and the resistor 66 may have a resistance of 20 kilo-ohms. The common junction of the resistors 64 and 66 is connected to the base of a transistor 68. The transistor 68 is of the PNP type, and it may be of the type presently designated 2N655.

The base of the transistor 68 is also connected to a resistor 70. This latter resistor may have a resistance of 200 kilo-ohms, and it is connected to the bus 58 to receive the vibrato signal from the oscillator $O_V$. The emitter of the transistor 68 is connected to a resistor 72 which is shunted by a capacitor 74. The resistor 72 may have a resistance of 200 ohms, and the capacitor 74 may have a capacitance of 25 microfarads. The resistor 72 and capacitor 74 are both connected to the grounded bus 60.

The collector of the transistor 68 is connected to a resistor 76. The resistor 76 may have a resistance of 2.4 kilo-ohms, and it is connected to the negative bus 62. The collector is also connected to a resistor R1 and to a capacitor C2 in the feedback loops. The junction of the capacitor C2 and the resistor R1 is connected to a resistance 78. This latter resistor may have a resistance of .25 megohm, and it is connected to the full bus 54. The resistor R1 is connected to a further resistor R2, and the junction of these resistors is connected to a third resistor 80. The latter resistor may have a resistance of 100 kilo-ohms, and it is connected to the deep bus 56. A capactior 79 is connected to the bus 52 and to the junction of capacitors C2 and C3.

The resistor R2 and the capacitor C3 are connected to a capacitor C4, and the latter capacitor is connected back to the base of the transistor 68. The junction of the resistors R1 and R2 is connected to a capacitor C1 which, in turn, is connected to the grounded bus 60. The junction of the capacitors C2 and C3, on the other hand, is connected to a variable resistor R3*a*. This resistor, in turn, is connected to a resistor R3*b*, and the latter resistor connects with a third resistor R3*c*. Three switches designated 84, 86 and 88 are connected to the respective resistors and to the grounded bus 60. These latter switches are on the keyboard, and they serve to tune the oscillator to the various tones and half-tones.

The oscillator circuit of FIGURE 4 will be recognized as being similar to the circuit of FIGURE 1 described above. In the oscillator circuit of FIGURE 4, the elements R1, R2 and C1 form the low-pass feedback path, whereas the elements C2, C3, R3*a*, R3*b* and R3*c* form the high-pass feedback loop. The resistors R3*b* and R3*c* may be selectively switched by the keyboard switches 84, 86 and 88 in and out of the oscillator circuit for tuning purposes.

The oscillator of FIGURE 4*a* is generally similar to the oscillator of FIGURE 4, and like elements in FIGURES 4 and 4*a* have been designated by the same numerals. However, in the embodiment of FIGURE 4*a*, the resistors 64 and 66 have been eliminated. The capacitor C4 has also been eliminated and replaced by a direct connection back to the base of the transistor 68.

In the circuit of FIGURE 4, the biasing and operating point of the transistor 68 is determined primarily by the resistors 64, 66 and 72. In the circuit of FIGURE 4*a*, however, the resistors 64 and 66 have been eliminated, as mentioned above. Also, the resistor 72 and capacitor 74 have been replaced by a direct connection to ground.

Therefore, in the latter circuit, the biasing and operating point of the transistor 68 is determined primarily by the resistors 76, R1 and R2. As noted, there is a direct collector-to-base feedback path in the circuit of FIGURE 4*a* through the resistors R1 and R2; whereas in the circuit of FIGURE 4, there is an alternating current feedback path only through the capacitor C4.

The most significant feature of the circuit of FIGURE 4*a* is that it is simpler and more economical to construct than the previous embodiment. At the same time, the circuit of FIGURE 4*a* is adequately stabilized.

The tone oscillators O1–O12 may each incorporate the circuit of FIGURES 4 or 4*a*. Each oscillator may be similar, except for the value of the capacitors C1, C2, C3 and of the resistors R1, R2, R3*a*, R3*b* and R3*c*. In some cases, changed values for the capacitor 79 from its stated value of .004 microfarad, and of the resistors 78 and 80 may be required to balance the tone output level between the oscillators.

The table of FIGURE 5 lists the values of the capacitors C1, C2, C3 and C4 and of the resistors R1, R2, R3*a*, R3*b* and R3*c* for adapting the twin-T oscillator of FIGURE 4 for use as the different tone oscillators O1–O12 of FIGURE 3. The tuning of the oscillators carried out by the terminal keyboard switches 84, 86 and 88, as mentioned, and through the action of the resistors R3*a*, R3*b* and R3*c*. The variable resistor R3*a* is adjustable to establish the highest frequency component of the particular oscillator.

The resistors R1 and R2 in the circuit of FIGURE 4*a* must have greater values than resistor 76, and they will have higher values than the corresponding resistors R1 and R2 in the circuit of FIGURE 4. Typical values of the bridge capacitors and resistors for various frequencies are given in the table of FIGURE 5*a*.

A twin-T oscillator circuit suitable for forming the bass oscillator $O_B$ is shown in FIGURE 6. The oscillator of FIGURE 6 also uses the 12 volt direct voltage source, whose positive terminal in this instance is connected to a grounded bus 100. A pair of resistors 102 and 104 are connected in series between the negative terminal of the 12 volt source and the grounded bus 100. The resistor 102 may have a resistance of 200 kilo-ohms, and the resistor 104 may have a resistance of 20 kilo-ohms. The common junction of the resistors 102 and 104 is connected to the base of a transistor 106. The transistor 106 is a PNP type, and it may be of the type presently designated 2N655.

The emitter of the transistor 106 is connected to a grounded resistor 108 of 200 ohms, for example, and that resistor is shunted by a capacitor 110. The capacitor may have a capacity, for example, of 25 microfarads. The collector of the transistor 106 is connected to a resistor 112. This resistor may have a resistance of 1.6 kilo-ohms, and it is connected to the negative terminal of the 12 volt direct voltage source.

The collector of the transistor 106 is also connected to a pair of low pass loop resistors 113 and 114. Each of these resistors may have a value of 8.2 kilo-ohms, and they are connected in series. The junction of the resistor 113 and 114 is connected to a grounded capacitor 116. This capacitor may have a capacity, for example, of 1 microfarad.

The collector of the transistor 106 is also connected to a capacitor 118. This capacitor, together with a series connected capacitor 119 are included in the high pass feedback loop. Each of these capacitors may have a capacity of .5 microfarad. The common junction of the capacitors 118 and 119 is connected through a 5 microfarad coupling capacitor 120 to the bass pre-amplifier 30 of FIGURE 3.

The capacitor 119 is connected to a capacitor 122. This latter capacitor may have a capacity of 1 microfarad, and it is connected back to the base of the transistor 106. The junction of the capacitor 118 and the capacitor 119 is connected to a variable resistor 124. This resistor 124 may have a resistance of 200 ohms, for example. The resistor 124 is connected to a string of series connected resistors 126, 128, 130, 132 and 134. These latter resistors may have respective resistance values, for example, of 43 ohms, 150 ohms, 180 ohms, 100 ohms and 390 ohms. The bass buttons $B_B$ are connected to the latter resistors in the illustrated manner. When any one of the bass buttons is depressed, the bass oscillator $O_B$ is tuned to a frequncy corresponding to the tone required when that particular button is depressed. The illustrated bass oscillator has six resistor taps for tuning the oscillator for the bass notes. The bass resistor may be expanded, however, to one full octave, by providing more resistor taps.

The vibrato oscillator $O_V$ is shown in circuit detail in FIGURE 7. This oscillator is also a twin-T type, and it is constructed to oscillate, for example, at 6 c.p.s. The oscillator circuit includes a PNP transistor 150 of the type presently designated 2N655. The base of the transistor 150 is connected to the junction of a pair of resistors 152 and 154. The resistor 152 may have a resistance, for example, of 470 kilo-ohms, and it is connected to the negative terminal of the 12 volt direct voltage source. The resistor 154 may have a resistance, for example, of 20 kilo-ohms, and it is connected to the grounded positive terminal of the 12 volt direct voltage source.

The collector of the transistor 150 is connected through a resistor 156 to the negative terminal of the 12 volt direct voltage source. The resistor 156 may have a resistance, for example, of 2.4 kilo-ohms. The emitter of the transistor 150 is directly connected to the grounded positive terminal of the 12 volt direct voltage source. The collector of the transistor 150 is also connected to a variable resistor 158 which may have a resistance of 25 kilo-ohms, and the variable resistor is coupled through a 5 microfarad coupling capacitor 160 to the tone and chord oscillators described above.

The low-pass feedback loop of the vibrato oscillator includes a pair of series resistors 162 and 164. Each of these resistors may have a resistance of 11 kilo-ohms, and the resistor 164 is coupled back to the base of the transistor 150 through a capacitor 166. The capacitor 166 may have a capacity of 5 microfarads. The junction of the resistors 162 and 164 is connected to a capacitor 168. The capacitor 168 may have a capacity, for example, of 10 microfarads, and it is connected to the grounded positive terminal of the 12 volt direct voltage source. The collector of the transistor 150 is also connected to a capacitor 170 in the high-pass feedback loop. The capacitor 170 may have a capacity of 5 microfarads, and it is connected to a like capacitor 172 and to a grounded variable resistor 174. The variable resistor 174 may have a resistance of 500 ohms. The capacitor 172 is connected to the junction of the resistor 164 and capacitor 166.

The variable resistor 158 constitutes a manual vibrato intensity control of the vibrato oscillator. The variable resistor 174, on the other hand, constitutes the manual vibrato rate control of the oscillator. The vibrato, or tremolo oscillator of FIGURE 7 is constructed to generate an approximate 6 c.p.s. sine wave signal which is variable in frequency by the adjustment of the variable resistor 174, and which is variable in intensity by adjustment of the variable resistor 158. The grounded emitter circuit of FIGURE 7, in which the emitter of the transistor 150 is directly grounded without a resistor or by-pass, is used in the vibrato oscillator since frequency stability is not as important as in the tone generators.

As noted, each of the tone oscillators O1–O12 in FIGURE 3 provides three semi-tones, starting in order from the oscillator O1 at the low frequency end of the keyboard 42. The character of the tone oscillator tuning is such that the highest frequency factor is predominant. In the oscillator O1, for example, if the C, C, sharp or D keys are depressed independently, the notes sound correctly. However, if both the C and D keys are depressed, only the D note will sound because the C resistor branch is shorted out.

The frequencies of the bass oscillator $O_B$ are one octave lower than the lowest keyboard frequencies.

Suitable chord intervals for the six most useful major chords are produced by the three independent separate chord oscillators $O_{C1}$, $O_{C2}$ and $O_{C3}$. It should be noted that these chord oscillators can yield intervals for a larger number of chords, by simply adding more switches and more resistor intervals. A suitable circuit for the three chord oscillators $O_{C1}$, $O_{C2}$ and $O_{C3}$ is shown in FIGURE 8, the illustrated oscillators also being of the twin-T type.

The oscillator circuits of FIGURE 8 are shown as being connected to the buses 52, 54, 56, 58, 60 and 62 referred to above. The buses 52, 54 and 56 extend to the voicing control unit 38, and these buses carry the brilliant, full and deep tones respectively. The bus 58 extends from the vibrato oscillator $O_V$, and it serves to introduce a vibrato signal to the chord oscillators $O_{C1}$, $O_{C2}$ and $O_{C3}$ in FIGURE 8. The bus 62 is connected with the negative terminal of the 12 volt direct voltage source, and the grounded bus 60 is connected to the positive terminal of the 12 volt source.

The chord oscillator $O_{C1}$ includes a PNP transistor of the type presently designated 2N655. This transistor is designated 200. The base of the transistor 200 is connected to the junction of a pair of resistors 202 and 204. The resistor 202 may have a resistance of 200 kilo-ohms, and it is connected to the bus 62. The resistor 204 may have a resistance of 20 kilo-ohms, and it is connected to the grounded bus 60. The base of the transistor 200 is also connected to a resistor 206. The latter resistor may have a resistance of 300 kilo-ohms, and it is connected to the vibrato bus 58. The collector of the transistor 200 is connected to a resistor 210. The latter resistor may have a resistance of 2.4 kilo-ohms, and it also is connected to the bus 62. The collector of the transistor 200 is also connected to a resistor 212, the latter resistor having a resistance of 200 kilo-ohms (for example) and being connected to the bus 54.

The emitter of the transistor 200 is connected to a resistor 214. This resistor may have a resistance of 200 ohms, and it is connected to a capacitor 216 which may have a capacitance of .3 microfarad. The emitter of the transistor 200 is also connected to a grounded capacitor 218, which may have a capacitance of 25 microfarads.

The capacitor 216 is connected to the junction of a pair of resistors 220 and 222. Each of these resistors may have a resistance of 11 kilo-ohms. The resistor 220 is connected to a capacitor 224, the capacitor having a capacity of .1 microfarad and being connected to the base of the transistor 200. The resistor 222, on the other hand, is connected back to the collector of the transistor 200. As resistor 226, having a resistance, for example of 56 kilo-ohms, is connected to the common junction of the resistors 220 and 222 and to the bus 56.

The circuitry of the chord oscillators $O_{C2}$ and $O_{C3}$ is similar to the circuitry of the chord oscillator $O_{C1}$ described above. For that reason, the corresponding circuitry in the chord oscillators $O_{C2}$ and $O_{C3}$ will not be described in detail.

In the chord oscillator $O_{C1}$, a pair of capacitors 230 and 232 is connected in series across the resistors 220 and 222. Each of these capacitors may have a capacity of .15 microfarad. The common junction of the capacitors is connected to the capacitor 234. The latter capacitor may have a capacity of .002 microfarad, and it is connected to the bus 52. In the chord oscillator $O_{C2}$, a pair of capacitors 236 and 238 is connected in series across the resistors corresponding to the resistors 220 and 222. Each of these latter capacitors may, likewise, have a capacity of .15 microfarad. In the chord oscillator $O_{C3}$, a pair of capacitors 240 and 242 is connected in series across the resistors corresponding to the resistors 220 and 222. Each of these latter capacitors may have a capacity of .1 microfarad.

The chord buttons $C_B$ illustrated in FIGURE 8 control a group of six push button switches. Each of the push-button switches is a three-pole single-throw combination. These combinations are designated respectively as B, F, C, G, D and A. The fixed contacts of the push-button switches which are controlled by the chord buttons $C_B$ are all connected to the grounded bus 60.

The common junction of the capacitors 230 and 232 of the chord oscillator $O_{C1}$ is connected to a variable resistor 250 which, in turn, is connected to a resistor 252. The variable resistor 250 may have a resistance of 100 ohms, and the resistor 252 may have a resistance of 180 ohms. The resistor 252 is connected to a resistor 254 which, in turn, is connected to a resistor 256. The resistor 254 may have a resistance of 180 ohms, and the resistor 256 may have a resistance of 300 ohms.

The common junction of the capacitors 236 and 238 of the chord oscillator $O_{C2}$ is connected to a variable resistor 257 which, in turn, is connected to a resistor 258. The variable resistor 257 may have a resistance of 200 ohms, and the resistor 258 may have a resistance of 300 ohms. The resistor 258 is connected to a resistor 260, the resistor 260 is connected to a resistor 262, and the resistor 262 is connected to a resistor 264. The resistor 260 may have a resistance of 73 ohms, the resistor 262 may have a resistance of 68 ohms, and the resistor 264 may have a resistance of 91 ohms.

The capacitors 240 and 242 of the chord oscillator $O_{C3}$ have their common junction connected to a variable resistor 266. The variable resistor 266 may have a resistance of 200 ohms, and it is connected to a resistor 268. The latter resistor may have a resistance of 410 ohms. The resistor 268 is connected to a resistor 270, which may have a resistance of 68 ohms. The resistor 270 is connected to a resistor 272 which may have a resistance of 91 ohms, and the resistor 272 is connected to a resistor 274 which may have a resistance of 240 ohms.

The upper contact of the push button B is connected to the junction of the resistors 252 and 254, the middle contact of that push button is connected to the junction of the resistors 258 and 260, and the lower contact of that push button is connected to the junction of the resistors 270 and 272. The upper contact of the push button F is connected to the common junction of the resistors 254 and 256, the middle contact of that push button is connected to the common junction of the resistors 262 and 264, and the lower contact of that push button is connected to the common junction of the resistors 270 and 272. The upper contact of the push button C is connected to the resistor 256, the middle contact of the push button C is connected to the junction of the resistors 262 and 264, and the lower contact of the push button C is connected to the junction of the resistors 272 and 274.

The upper contact of the push button G is connected to the resistor 256, the middle contact of the push button G is connected to the resistor 264, and the lower contact of the push button G is connected to the resistor 274. The upper contact of the push button D is connected to the junction of the resistors 254 and 256, the middle contact of the push button D is connected to the junction of the resistors 258 and 260, and the lower contact of the push button D is connected to the junction of the resistors 268 and 270. The upper contact of the push button A is connected to the junction of the resistors 254 and 256, the middle contact of the push button A is connected to the junction of the resistors 260 and 262, and the lower contact of the push button A is connected to the junction of the resistors 272 and 274.

It is evident that the actuation of the different chord buttons $C_B$ causes the chord oscillators to assume different frequencies which provide the different desired chords.

Appropriate circuitry for the bias mixing pre-amplifier 30 and for the treble mixing pre-amplifier 40 is shown in FIGURE 9. The illustrated treble pre-amplifier circuit incorporates a PNP transistor 300 of the type presently designated 2N655, and the illustrated bass mixing pre-amplifier circuit includes a similar transistor 302. The base of the transistor 300 is connected to the junction of a pair of resistors 304 and 306. The resistor 304 may have a resistance of 100 kilo-ohms, and it is connected to the negative terminal of the 12 volt direct voltage source. The resistor 306 has a resistance of 10 kilo-ohms, for example, and it is connected to the grounded positive terminal of that source. The output signal from the voicing unit 38 is introduced to the base of the transistor 300 through a coupling capacitor 308. The coupling capacitor may have a capacity, for example, of 5 microfarads.

The collector of the transistor 300 is connected to a resistor 310. This resistor may have a resistance of 6.2 kilo-ohms, and it is connected to the negative terminal of the 12 volt direct voltage source. The emitter of the transistor 300 is connected to a resistor 312 which may have a resistance of 1 kilo-ohm, and that resistor is shunted by a capacitor 314 which may have a capacity of 25 microfarads; the resistor 312 and the capacitor 314 being connected to the ground bus 60.

The collector of the transistor 300 is connected to a coupling capacitor 316 which may have a capacity of 5 microfarads. The capacitor 316 is connected to a resistor 318. The resistor 318 may have a resistance of 10 kilo-ohms, and it is connected to a grounded potentiometer 320. The potentiometer 320 may have a resistance of 1 meg-ohm, and it constitutes the volume control. This potentiometer is normally included in the swell control unit 32 of FIGURE 3. The movable contact of the potentiometer 320 is connected to the primary winding 322 of an input transformer in the final amplifier 34 of the system.

The ouput signal from the bass oscillator $O_B$ is introduced through a coupling capacitor 324 to the base of the transistor 302 in the bass mixing preamplifier 30. This latter capacitor may have a capacity, for example, of 5 microfarads. The base of the transistor 302 is also connected to the junction of a pair of resistors 326 and 328. The resistor 326 has a resistance, for example, of 100 kilo-ohms, and it is connected to the negative terminal of the 12 volt direct voltage source. The resistor 328 may have a resistance of 10 kilo-ohms, and it is connected to the grounded positive terminal of that source. The collector of the transistor 302 is connected to a resistor 330. This resistor may have a resistance of 6.2 kilo-ohms, and it is connected to the negative terminal of the 12 volt direct voltage source. The collector of the transistor 302 is also coupled through a coupling capacitor 332 and through a resistor334 to the volume control potentiometer 320. The capacitor 332 may have a capacity of 5 microfarads, and the resistor 334 may have a resistance of 47 kilo-ohms. The emitter of the transistor 302 is connected to a grounded resistor 340, the resistor being shunted by a capacitor 342. The resistor 340 may have a resistance of 1 kilo-ohm, and the capacitor 342 may have a capacity of 25 microfarads.

The treble pre-amplifier 40 operates in known manner to amplify the output signals from the voicing control unit 38, and to introduce the amplified signals to the volume control potentiometer 320. Likewise, the bass pre-amplifier 30 amplifies the signals from the bass oscillator $O_B$, and likewise introduces the amplified signals to the volume control potentiometer 320. The signals introduced by the two amplifiers to the volume control potentiometer are mixed in a linear manner and introduced to the final amplifier 34 for power amplification. The resulting amplified tones from the amplifier 34 are reproduced by the speaker 36.

In embodiments of the invention incorporating a 5 watt or larger output amplifier 34, the best isolation between the bass and treble ranges is obtained by incorporating separate pre-amplifiers, such as the pre-amplifiers 30 and 40 of FIGURES 3 and 9. The output signals from the pre-amplifiers may then be mixed in the isolation capacitors and resistors 316, 318, 332 and 334 to balance bass and treble outputs for the best proportionality.

The swell control may be obtained by extending the control arm of the volume level potentiometer 320 to a spring loaded knee lever or foot pedal. The output amplifier 34 may be a commercial amplifier, for example, with about 7 watts of maximum undistorted power output.

The simple six voice tone register for the voicing control unit 38 is shown in FIGURE 10. The buses 52, 54, and 56 are connected to the voicing control unit; and the unit includes, for example, a series of six single-pole single-throw switches which may be in the form of organ "stops" to be opened or closed at will. The first switch 350 serves to connect the bus 56 to the output bus 352 of the control unit. This causes the deep tones of the bus 52 to be introduced to the output bus to provide a "flute" organ tone. A second switch 351 serves to connect the full bus 54 to the output bus 352, so as to provide a full "sax horn" tone on the output bus. Likewise, a switch 354 serves to connect the brilliant bus 52 to the output bus 352 to provide an oboe-like tone on the output bus.

The voicing control unit 38 also includes choke coils 358, 362, and 366. These coils can be connected between the brilliant bus 52 and the treble pre-amplifier input 352 by switches. Additional switches are included to provide certain other tones. For example, a 2 millihenry choke coil 358 is connected to the bus 52 and to a switch 360. The switch 360 serves to connect the chock 358 to the output bus 352 to provide a French horn type of tone on the output bus. Likewise, a .5 millihenry choke 362 is shown as connecting the brilliant bus 52 to a switch 364. The switch 364 serves to connect the choke 362 to the output bus 352 to provide an open trumpet tone for the organ. A 1 millihenry chock 366 is connected in series with the choke 362 and to a switch 368. The latter switch serves to connect the two chokes 362 and 366 in series to the output bus 352 to provide a muted trumpet tone on the output bus.

Therefore, in the control unit of FIGURE 10, the deep full and brilliant outputs of the tone and chord oscillators are used unaltered for three of the organ voices. However, the brilliant output is further modified by the chokes 358, 362 and 366 to provide further organ voices.

Although a particular embodiment of the invention has been illustrated and described, it is evident that modifications may be made. For example, a low power final amplifier 34 may be used without pre-amplifiers for a lower cost small organ instrument. In order to obtain good reproduction in such an organ of the treble chords and bass, careful balancing is required. Also, the more economical unit may incorporate a solo keyboard which is not designed for chord playing. The twin-T oscillators may be tuned over a range of approximately 1⅓ octaves with single resistor tuning, so that the solo keyboard requires only one oscillator per octave.

The invention provides, therefore, a simple and improved electronic organ which utilizes a twin-T type of oscillator for stable tone characteristics and for the directed production of different tone effects at the same fundamental frequency for organ voicing purposes. This organ oscillator readily lends itself to modulation for tremolo or vibrato purposes, and it can also be tuned to provide different tone frequencies in a straight-forward manner as by switching of resistances in the bridge network of the oscillator.

I claim:

1. An electronic musical instrument including in combination, at least one transistor oscillator circuit including a high-pass T-filter network and a low-pass T-filter network together forming a twin-T feedback network for producing the required phase shift at a selected audio frequency to sustain oscillations, said high-pass T-filter network having a midsection with an output point therein at which a non-sinusoidal output signal is developed, and said low-pass T-filter network having a midsection with an output point therein at which a sinusoidal output signal is developed such that said output signals have different tonal qualities, control means coupled to said oscillator circuit for causing said oscillator to generate said output signals at at least one pre-established fundamental frequency, utilization means including a sound reproducer, and a voicing control means coupled to said output points in said T-filter networks and to said utilization means for selectively introducing said output signals of different harmonic contents from said output circuit means to said utilization means.

2. An electronic musical instrument including in combination, at least one transistor oscillator circuit including a high-pass T-filter network and a low-pass T-filter network together forming a twin-T feedback network for producing the required phase shift at a selected audio frequency to sustain oscillations, each of said T-filter networks having a midsection, said oscillator circuit having a first output point at which a first non-sinusoidal signal at the fundamental frequency of the oscillator is developed, said oscillator circuit further having a second output point in the midsection of said high-pass T-filter network at which a second non-sinusoidal output signal is developed and a third output point in the midsection of said low-pass T-filter network at which a sinusoidal output signal is developed, control means coupled to said oscillator circuit for causing said oscillator to generate said output signals at at least one pre-established fundamental frequency, utilization means including a sound reproducer, and voicing control means coupled to said output points of said oscillator circuit and to said utilization means for selectively introducing said output signals from said oscillator circuit to said utilization means.

3. The electronic musical instrument of claim 2 including further a vibrato oscillator for generating a vibrato signal of a particular frequency and amplitude, and means coupled to said vibrato oscillator for introducing said vibrato signal to said transistor oscillator to vary the frequency of the same at a rate and by an amount determined by the frequency and amplitude of said vibrato signal.

4. In an electronic musical instrument, the combination of an oscillator circuit of the twin-T type including a transistor having emitter, base and collector electrodes, said oscillator circuit further including a high-pass T-filter network and a low-pass T-filter network intercoupling said collector and base electrodes of said transistor for producing the required phase shift at a selected audio frequency to sustain oscillations, said low-pass T-filter network including a pair of series connected resistors having a common junction and capacitor means connected to said common junction, and said high-pass T-filter network including a pair of series connected capacitors having a common junction and resistor means connected to said common junction, a first output circuit connected to the collector electrode of said transistor to derive therefrom a non-sinusoidal output signal at the fundamental frequency of the oscillator, a second output circuit connected to said common junction of said low-pass T-filter network to derive therefrom a sinusodial output signal, control means coupled to said oscillator circuit for causing the same to generate said output signals at at least one pre-established fundamental frequency, utilization means including a sound reproducer, and voicing control means connected to said output circuits and to said utilization means for selectively supplying said output signals to said utilization means.

5. An electronic musical instrument including in combination, at least one transistor oscillator circuit including a high-pass T-filter network and and a low-pass T-filter network together forming a twin-T feedback network for producing the required phase shift at a selected audio frequency to sustain oscillation, each of said filter networks having a midsection, said oscillator circuit having a first output point at which a non-sinusoidal signal at the fundamental frequency of the oscillator is developed, said oscillator circuit further having a second output point at the midsection of said low-pass T-filter network at which a sinusoidal output signal is developed, control means coupled to said oscillator circuit for causing said oscillator to generate said output signals at at least one pre-established fundamental frequency, utilization means including a sound reproducer, and voicing control means coupled to said output points of said oscillator circuit and to said utilization means for selectively introducing said output signals from said oscillator circuit to said utilization means.

References Cited by the Examiner

UNITED STATES PATENTS

| | | | |
|---|---|---|---|
| 2,342,286 | 2/44 | Kock. | |
| 2,506,723 | 5/50 | Larsen | 84—1.19 X |
| 2,788,693 | 4/57 | Seybold | 84—1.26 |

ARTHUR GAUSS, *Primary Examiner.*